Figure 1:
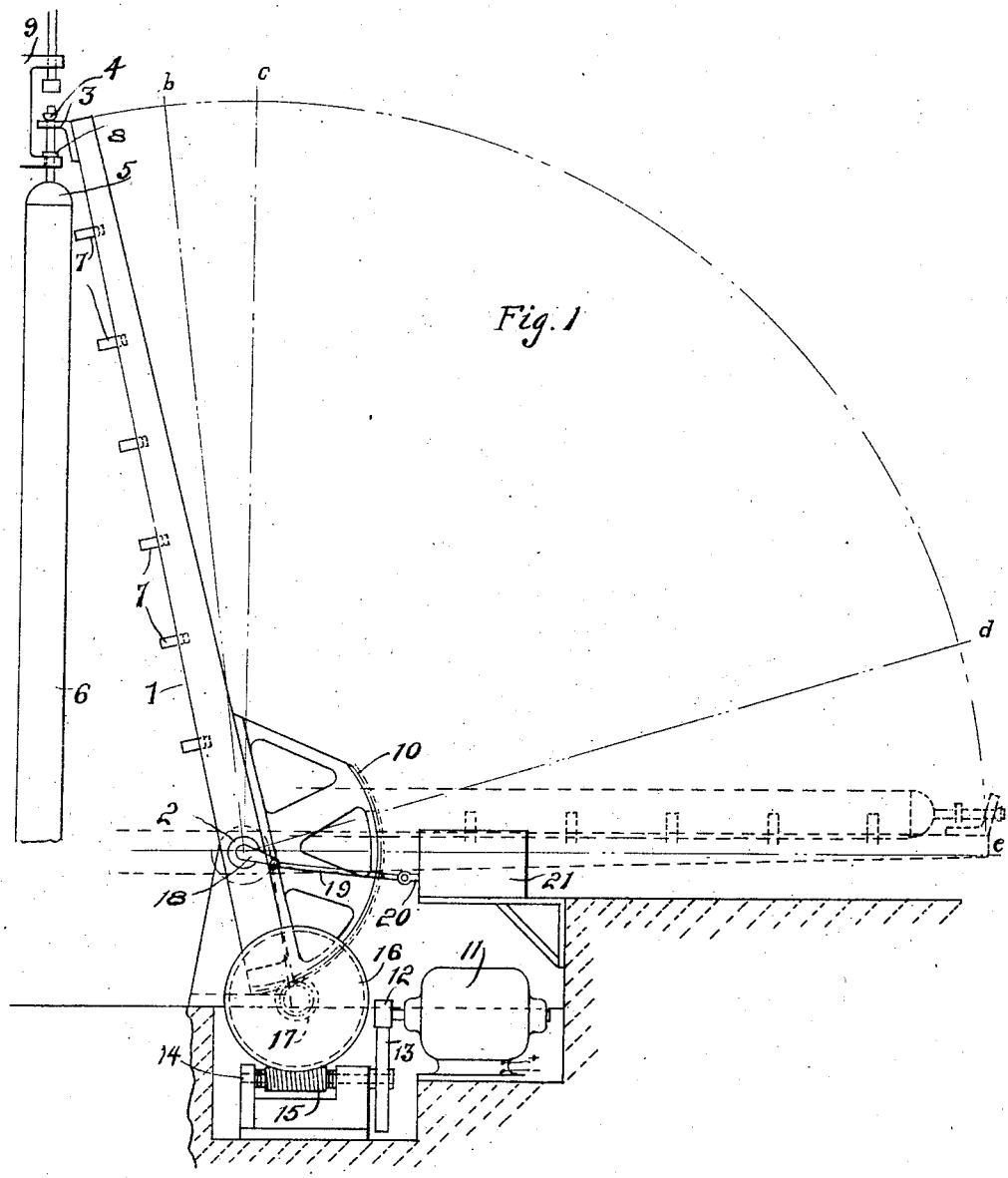

H. F. HITNER.
TAKE-DOWN APPARATUS FOR HANDLING GLASS CYLINDERS.
APPLICATION FILED AUG. 18, 1911.

1,096,627.

Patented May 12, 1914.

2 SHEETS—SHEET 1.

WITNESSES

INVENTOR
Harry F. Hitner

H. F. HITNER.
TAKE-DOWN APPARATUS FOR HANDLING GLASS CYLINDERS.
APPLICATION FILED AUG. 18, 1911.
1,096,627.
Patented May 12, 1914.
2 SHEETS—SHEET 2.
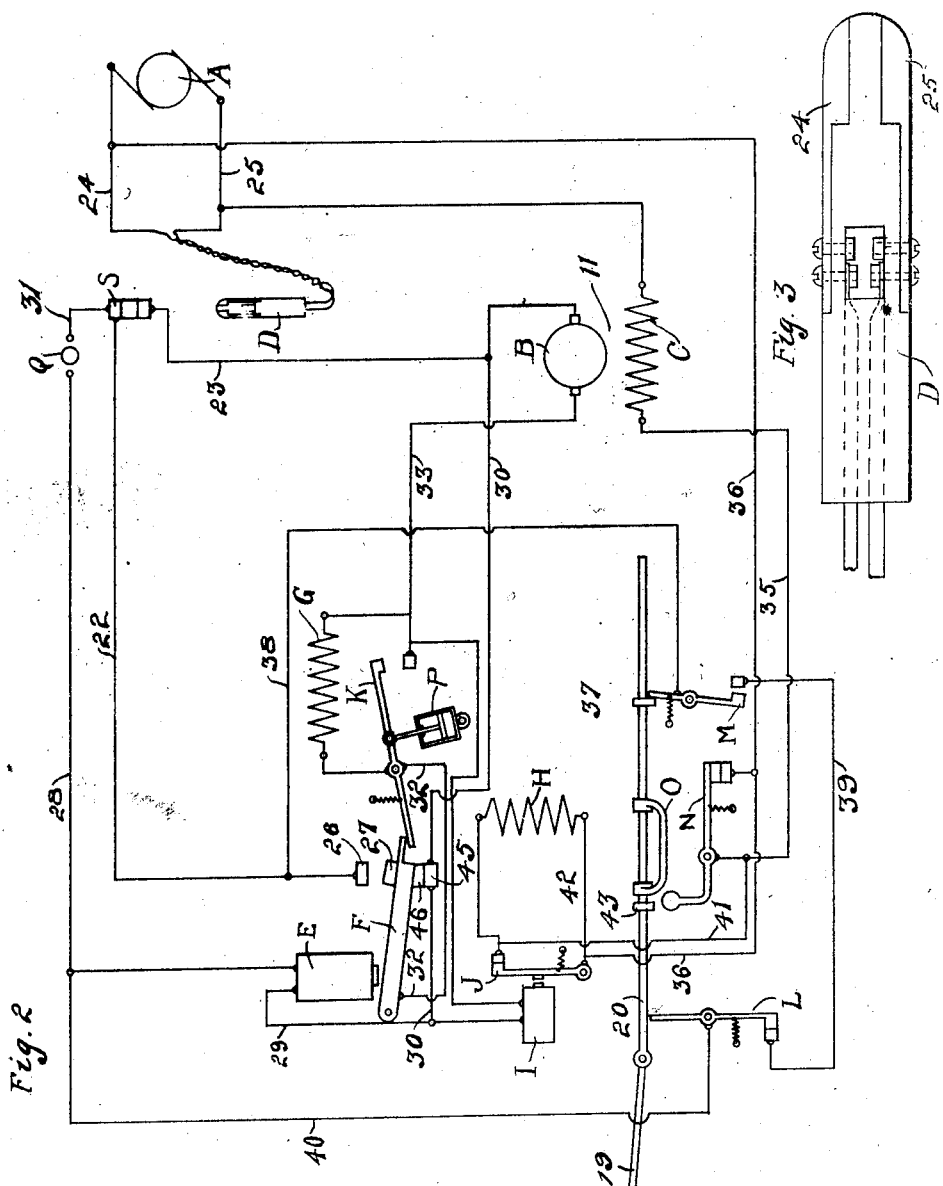
WITNESSES
INVENTOR

UNITED STATES PATENT OFFICE.

HARRY F. HITNER, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

TAKE-DOWN APPARATUS FOR HANDLING GLASS CYLINDERS.

1,096,627.  Specification of Letters Patent.  Patented May 12, 1914.

Application filed August 18, 1911. Serial No. 644,726.

*To all whom it may concern:*

Be it known that I, HARRY F. HITNER, a citizen of the United States, residing at Mount Vernon, in the county of Knox and State of Ohio, have invented certain new and useful Improvements in Take-Down Apparatus for Handling Glass Cylinders, of which the following is a specification.

The invention relates to take down apparatus for moving machine-made glass cylinders from the vertical position occupied when drawn to a horizontal position, and the invention has for its objects the provision of an operating mechanism, which, when once set in motion, will take care of the taking down operation with only a small amount of attention from the operator, thus permitting the operator to handle a plurality of machines with safety, and the provision of an operating mechanism by means of which the taking down of the cylinders may be accomplished with a maximum degree of rapidity without danger of breakage.

One embodiment of the invention is illustrated in the accompanying drawings wherein Fig. 1 is a side elevation of the taking down frame and its operating mechanism, Fig. 2 is a diagrammatic view of the wiring circuits and controlling devices, and Fig. 3 is a side elevation of the switch plug employed.

Referring first to Figure 1, the member 1 is a tilting take-down frame which may be of any approved design, such frame being pivoted at 2, and having at its upper end a fork 3 for engaging and supporting a collar 4 upon the bait 5, the member 6 being a glass cylinder which has been drawn and which it is desired to move to a horizontal position. The frame 1 is also provided with a plurality of sets of arms 7, which sets of arms are so shaped as to receive the cylinder and support it when the frame 1 has swung past its vertical position. The handle of the bait 5 is also provided with the usual collar 8 which is engaged by the forked member 9 carried by the drawing frame (not shown), the arrangement being such that when the frame 1 is swung to the right, the fork 3 lifts the bait by virtue of its engagement with the collar 4, thus disengaging the collar 8 from the supporting fork 9. The frame is provided with a segmental gear 10 which gear is operated from a motor 11 by means of a train of reduction gearing including a pinion 12 carried by the shaft of the motor and engaging a spur gear 13 on counter shaft 14, and a worm 15 carried by the shaft 14 and operating a worm wheel 16 keyed to the shaft of the gear 17 which meshes with the segmental gear 10. The kind of reduction gearing employed is unimportant, and the arrangement shown might be very decidedly modified to suit conditions. The shaft 2 of the frame 1 is provided with a crank arm 18 carrying a connecting rod 19, which in turn operates a switch rod 20, such switch rod being associated with the controlling mechanism of the apparatus in the casing 21 in the manner to be hereinafter described, and illustrated in detail in Figure 2.

Briefly stated, the arrangement of the controlling mechanism for the motor is such that the movement of the frame 1 from the position shown to the position indicated in dotted lines and marked $b$ is very slow in order to insure the maintenance of a proper connection between the fork 3 and collar 4 and a proper disengagement between the fork 9 and the collar 8. After such disengagement, a somewhat higher speed may be given the frame, and the controlling mechanism therefore causes an increased speed from the point $b$ to the point marked $c$, such speed, however being only about half the maximum speed of movement during a later operation, inasmuch as it is desirable that the cylinder 6 should swing gently against the engaging arms 7, thus obviating any danger of breakage due to such engagement. After the frame has passed the vertical position $c$ indicated by the dotted lines, the speed may safely be brought up to a maximum, and from the point marked $c$ to the point indicated by the dotted line $d$, the frame swings at a maximum rate of speed, the change in the rate of speed at the point $c$ being automatically secured by the controlling apparatus. After the frame has reached the position marked $d$, it is desirable to decrease the speed of movement in view of the fact that the frame is approaching the horizontal position at which it must be stopped, so that at this position $d$ the speed is automatically reduced by the controlling apparatus to about one half the speed between the positions $c$ and $d$. When the frame reaches the position indicated by the dotted line $e$, the current is automatically cut off and a dynamic braking force is applied to the armature of the motor, thus bringing the frame to a stop. It will therefore be seen that from the time the apparatus is started until it is stopped, no attention by the operator is required, and that the regulating apparatus gives exactly the necessary amount of speed at each portion of the travel of the frame. In bringing the frame from the position marked e to the position shown in full lines, the operation as just described is reversed, the slow movement of the frame from the position marked c to the position of engagement with the collar 4 being desirable in order to avoid a jar when the fork 3 engages the handle of the blow-pipe. With the foregoing description of the objects to be secured by the controlling apparatus, such controlling apparatus as shown in Fig. 2 in detail will be readily understood, and such mechanism will now be described.

Fig. 2 illustrates diagrammatically the controlling apparatus, the parts of such apparatus being in the position occupied when the take down frame 1 is in the position indicated in Fig. 1. The principal parts shown in this diagrammatic view are as follows: A is the electric generator for supplying current to the motor 11 heretofore mentioned, B being the armature, and C the field of such motor; S is a switch socket for receiving the switch plug D shown in detail in Fig. 3; E is the electromagnet of an automatic switch, which magnet controls the movement of the switch arm F; such switch arm normally occupying the position shown by reason of its weight; G is the armature resistance of the motor 11, H is the field resistance of such motor; I is the electromagnet for opening the switch arm J, such switch arm being normally spring-held closed; K is a switch for short circuiting the armature resistance G, such switch K being normally closed yieldingly but being held open when the parts are in the position indicated in the figure by reason of the weight of the switch arm F which engages the left hand end of such switch arm K; L and M are switches normally spring held closed; such switches being pivoted and being adapted to be opened by the collars on the switch rod 20; N is a switch arm normally spring-held closed, but adapted to be opened by the cam O of the switch rod 20; and P is a dash pot whose piston is connected to the switch arm K, so that the closing of such switch arm K is retarded for the purpose as hereinafter set forth.

The two sides of the switch sockets are connected to the wires 22 and 23, and connection is made to this switch plug from the generator A by means of the plug D, which plug, as indicated in Fig. 3, is provided with the metal strips 24 and 25 adapted to contact with suitable contact plates on the opposite sides of the socket S, so that when the plug is in position in the socket, the wires 22 and 23 are connected to the wires 24 and 25 from the generator.

Starting with the take down and other parts in the position indicated in Figs. 1 and 2, the operation is as follows: The plug D is placed in the socket S, but no movement of the motor parts occurs as the contact member 26 is not in engagement with the contact member 27. In order to complete the circuit, therefore, it is necessary that the switch arm F should rise and the movement of this switch arm is accomplished by pressing the switch button Q in order to secure the energization of the magnet E. When this button is pushed, the circuit through the magnet winding E is completed via the wires 28, 29, 30, 23, the plug and socket, the generator, and the wire 31. This energization of the magnet winding E causes the switch arm F to rise so that the contact member 27 engages the contact member 26, and the circuit through the armature B of the motor is completed via the wire 22, contacts 26 and 27, switch arm F, wire 32, armature resistance G, wire 33, armature B, and wire 23. At this same time the switch N is closed so that the field circuit is completed via the wire 35, switch N, and wire 36. The motor and take down frame are thus started to move, the movement being slow because of the inertia of the parts and because of the armature resistance G in the armature circuit. The pressure on the button Q need to be momentary only as the collar 37 on the switch rod 20 is moved away from the switch arm M, thus permitting such switch to close, and as a result, the magnet E of the automatic switch is energized through a new circuit which is as follows: Wire 22, wire 38, switch M, wire 39, switch L, wire 40, magnet winding E, wire 29, wire 30, and wire 23. Under these conditions the take down frame moves slowly to the position b, at which time an increase of speed occurs by reason of the armature resistance G being short circuited. This is accomplished by the dash pot P the piston of which normally tends to close the switch K, such switch K having previously been held open by the weight of the arm F. When such switch is closed by the dash pot, the current passes through such switch arm instead of passing through the armature resistance G and the motor is therefore speeded up when such resistance is cut out. This rate of movement is continued until the take down frame 1 reaches the position marked c in Fig. 1, at which time the cylinder engages the arms 7 and it is desirable that a higher speed be given the motor. This high speed is secured by the automatic throwing in of the field resistance H. This resistance is normally cut out of the field circuit as the current from the wire 35 passes through the switch arm N and back through the wire 36. When, however, the cam O engages the end of the switch arm N, such switch arm is opened and the current from the wire 35 passes through the wire 41, the field resistance H, and the wire 42 to the wire 36, and the addition of this resistance to the field resistance increases the speed of the motor. At this same time the switch J is opened inasmuch as the strength of the winding I is such that when the motor reaches half speed, the winding causes the switch J to open so that the switch cannot at this time cause a short circuiting between the wires 41 and 42. The use of this switch J and operating winding I is desirable inasmuch as means are thus provided for short circuiting the field resistance when the motor is started with the take down frame between the points $c$ and $d$. Under these conditions, if the field resistance H were in the circuit, the motor would start very slowly on a weak field. With such field resistance cut out of the circuit by the short circuiting with the arm J, the motor will start very much more rapidly. The high speed will be maintained during the major portion of the travel of the frame 1, that is, between the points $c$ and $d$, and while the cam O holds the switch N open.

When the take down frame reaches the position $d$ and the cam O slides off of the end of the switch arm N, such switch arm closes and the current instead of passing through the field resistance, is short circuited by the arm N and the motor is correspondingly slowed down so that the movement of the parts may be very easily checked when the take down frame reaches the position marked $e$. The automatic stopping of the take down frame when it reaches the position $e$ is accomplished by means of the switch L, the collar 43 on the switch rod 20 engaging the upper end of such switch arm and opening it. This breaks the circuit through the automatic switch E, the arm L being a portion of such circuit, and as a result, the switch arm F drops, breaking the contact between the members 26 and 27. At this time, the contact member 46 on the arm F contacts with the member 45, and a dynamic braking action is secured by reason of the fact that the armature circuit including the armature resistance G is completed, such circuit, it will be seen, including the wire 30, contact 45, contact 46, switch arm F, wire 32, armature resistance G and wire 33. The movement of the parts will thus be very quickly and yet yieldingly stopped. When it is desired to bring the take down frame from the position marked $d$ to the position shown in full lines in Fig. 1, the plug D is reversed in its socket and the push button Q operated, the series of operations which occur being simply the reverse of those heretofore described, the take down frame having a moderate speed from the position $e$ to the position $d$, a high speed from the position $d$ to the position $c$ and a moderate speed from the position $c$ to the final position shown in full lines, just before which time the switch M is opened by the collar 37, thus causing the breaking of the motor circuit and permitting the arm F of the automatic switch to fall and close the armature circuit. This provides a dynamic brake for stopping the movement of the parts without a jar as heretofore explained.

It will be understood that the invention is not limited to the precise type of electrical devices illustrated, some of such parts as illustrated being somewhat crude and diagrammatic for the sake of simplicity in illustration and description. For instance, some of the ordinary types of automatic motor starters could be used in place of the switch parts E, F, K and P, and the mechanism might be largely modified in matter of detail in other particulars.

Having thus described my invention and illustrated its use, what I claim as new and desire to secure by Letters Patent is the following:—

1. Mechanism for operating a tilting take down frame for glass cylinders, comprising a source of electric supply, a shunt wound motor having an armature resistance for moving the frame, a switch for cutting out the said resistance, arranged when not restrained to close yieldingly, automatic restraining means for holding the switch open and adapted to be released by the closing of the motor circuit, and retarding means for securing a gradual closing of the switch after it has been released, so that the resistance is retained in the motor circuit until the tilting frame has moved a predetermined distance, at which time the said resistance is cut out and the movement of the motor and tilting frame accelerated.

2. Mechanism for operating a tilting takedown frame for glass cylinders comprising electric supply, a motor for operating the frame, a main switch in the motor circuit, an automatic switch in the motor circuit normally maintained yieldingly in open position, an electromagnetic controlling winding for closing the automatic switch lying in a circuit supplied from the said source and provided with a switch member yieldingly self opening for completing the circuit, and means controlled by the movement of the frame whereby the circuit through the said winding is completed independent of the said switch member after the frame has moved a predetermined distance.

3. Mechanism for operating a tilting takedown frame for glass cylinders comprising electric supply, a motor for operating the frame, a main switch in the motor circuit, an automatic switch in the motor circuit normally maintained yieldingly in open position, an electromagnetic controlling winding for closing the automatic switch lying in a circuit supplied from the said source and provided with a switch member yieldingly self opening for completing the circuit, means controlled by the movement of the frame whereby the circuit through the said winding is completed independent of the said switch member after the frame has moved a predetermined distance, and a switch in the winding circuit arranged to be opened by the movement of the frame when the frame approaches its extreme position.

In testimony whereof I have hereunto signed my name in the presence of the two subscribed witnesses.

HARRY F. HITNER.

Witnesses:
 BAUM M. ALLEN,
 E. F. EYNON.